United States Patent
Häkkinen et al.

(10) Patent No.: US 6,282,185 B1
(45) Date of Patent: Aug. 28, 2001

(54) TRANSMITTING AND RECEIVING METHOD AND RADIO SYSTEM

(75) Inventors: Hannu Häkkinen; Ari Hottinen, both of Espoo; Mikko Kokkonen; Risto Wichman, both of Helsinki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/068,169

(22) PCT Filed: Sep. 5, 1997

(86) PCT No.: PCT/FI97/00525

§ 371 Date: May 4, 1998

§ 102(e) Date: May 4, 1998

(87) PCT Pub. No.: WO98/10542

PCT Pub. Date: Mar. 12, 1998

(30) Foreign Application Priority Data

Sep. 5, 1996 (FI) .................................................. 963479

(51) Int. Cl.[7] ...................................................... H04J 13/00

(52) U.S. Cl. .......................... 370/342; 370/319; 370/335; 370/441; 375/130

(58) Field of Search ................................... 370/319, 320, 370/335, 342, 343, 441, 479; 375/130, 131, 132, 135, 136, 138

(56) References Cited

U.S. PATENT DOCUMENTS

| | | | |
|---|---|---|---|
| 5,140,610 | * 8/1992 | Holliday et al. | ............................ 375/1 |
| 5,521,937 | 5/1996 | Kondo et al. | ............................ 375/206 |
| 5,805,583 | * 9/1998 | Rakib | ................................. 370/342 |
| 5,825,835 | * 10/1998 | Kingston et al. | .................... 370/335 |

FOREIGN PATENT DOCUMENTS 0 491 668    6/1992 (EP) ............................... H04J/13/00

OTHER PUBLICATIONS

Youn, et al., *Canadian Conference on Electrical and Computer Engineering*, vol. 1, "A Multi–Carrier CDMA System Using a Concatenated Orthogonal/PN Spreading Scheme", p. 202–205, 1996.

Fazel, *International Conference on Universal Personal Communications*, vol. 2, "Performance of CDMA/OFDM for Mobile Communications System", p. 975–979, 1993.

Lupas and Verdu, *IEEE Transactions on Information Theory*, vol. 35, "Linear Multiuser Detectors for Synchronous Code–Division Multiple–Access Channels", p. 123–136, 1989.

Lupas and Verdu, *IEEE Transactions on Communications*, vol. 38, "Near–Far Resistance of Multiuser Detectors in Asynchronous Channels", p. 496–508.

Varanasi and Aazhang, *IEEE Transactions on Communications*, vol. 38, "Multistage Detection in Asynchronous Code–Division Multiple–Access Communications", p. 509–519, 1990.

Copy of the International Search Report for PCT/FI97/00525.

* cited by examiner

*Primary Examiner*—Douglas Olms
*Assistant Examiner*—Shick Hom
(74) *Attorney, Agent, or Firm*—Altera Law Group, LLC

(57) ABSTRACT

The invention relates to a transmitting and receiving method and a radio system. In a transmitter the signals to be transmitted are spread coded in means and modulated by subcarriers in means. In a receiver (R) the signals are demodulated in means and submitted to multiuser detection in means by using the subcarriers to limit the number of detectable signals in the means. The receiver uses multiuser detection for reducing multiple access interference and correcting frequency-selective fading.

20 Claims, 1 Drawing Sheet

TRANSMITTING AND RECEIVING METHOD AND RADIO SYSTEM

FIELD OF THE INVENTION

The invention relates to a transmitting and receiving method used in a digital radio system comprising at least one base station and subscriber terminal communicating with one another by transmitting and receiving signals.

The invention also relates to a radio system comprising at least one base station and subscriber terminal with a transmitter and receiver arranged to transmit and receive digital signals.

DESCRIPTION OF THE PRIOR ART

In the CDMA method (Code Division Multiple Access), a narrow-band user data signal is multiplied to a relatively broad band by a spreading code having a considerably higher frequency than the data signal. Upon multiplication, the data signal is spread to the entire band in use. All users use the same frequency band for simultaneous transmission. The objective is to select mutually substantially orthogonal spreading codes, i.e. codes that have minimal mutual correlation.

In a CDMA receiver implemented in a conventional manner, a data signal is returned in the receiver to the original band by multiplying it again with the same spreading code as at the transmission stage. The signals of other users impede the detection of the desired signal by distorting the received signal. This interference, caused by users to each other, is called multiple access interference.

In the OFDMA method (Orthogonal Frequency Division Multiple Access) the spread-coded symbol train of a transmission signal is modulated by subcarriers which are preferably distributed to a wide frequency band. OFDMA modulation is typically carried out by inverse Fourier transformation.

Multipath propagation causes distortion or crosstalk on radio system channels. In the CDMA system this can be detected in that a signal originally spread-coded with orthogonal spreading codes is no longer orthogonal upon arrival at a receiver, there being crosstalk between signals of different channels. In the OFDMA system, subcarriers attenuate frequency-selectively, impairing detection. In the CDMA system, crosstalk is adjusted by using interference cancellation. In the OFDMA system, frequency-selective attenuation is compensated for by error correction.

However, the complexity of all methods eliminating crosstalk generated by multipath propagation increases faster than the amount of information/the bit string to be processed. Consequently, known methods cannot remove this problem.

SUMMARY OF THE INVENTION

It is the object of the present invention to implement a method and a radio system in which the amount of information to be processed can be limited thus allowing better elimination of various disturbances.

This is achieved with the method described in the preamble, characterized in that upon transmission the signals are spread-coded and modulated by subcarriers in accordance with the OFDMA/CDMA methods, and upon reception the signals are demodulated and multiuser-detected by selecting the signals to be detected in the multiuser detection using the subcarriers and consequently reducing the number of signals in the multiuser detection.

The radio system of the invention is characterized in that the transmitter comprises means for spread coding and means for modulating the transmission signals by subcarriers in accordance with the OFDMA/CDMA methods, and the receiver comprises demodulation means arranged to select a detectable signal on the basis of subcarriers, and means for multiuser detection of the received signals.

The method of the invention provides considerable advantages. The method of the invention enables good tolerance of interference caused by channel isolation and signal multipath propagation by means of a simple receiver implementation.

DESCRIPTION OF THE DRAWINGS

In the following the invention will be described in more detail with reference to the examples according to the attached drawings, in which.

DESCRIPTION OF THE PREFERRED EMBODIMENTS

The solution of the invention is particularly applicable to the OFDMA/CDMA radio system without, however, being restricted to it.

Figure 1:
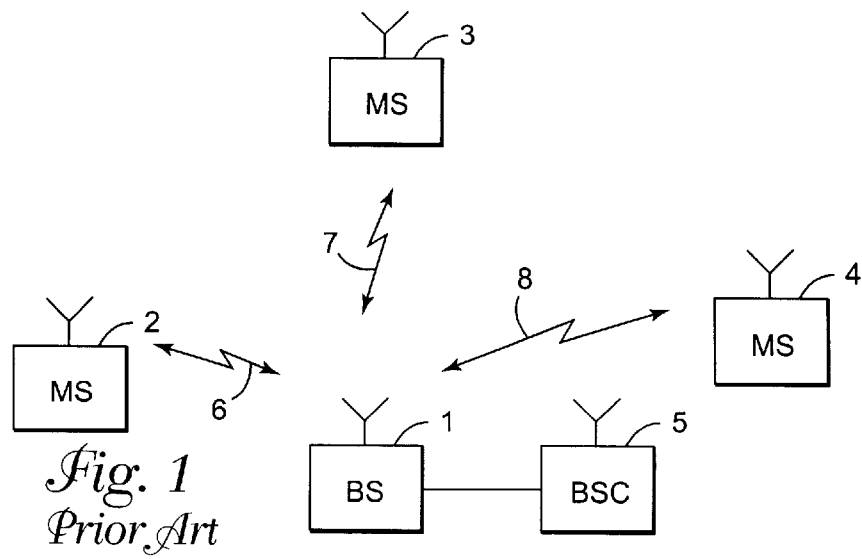
FIG. 1 shows a radio system.

FIG. 1 shows a typical digital radio system comprising a base station 1, subscriber terminals 2 to 4, and a base station controller 5. The base station 1 communicates with the subscriber terminals 2 to 4 using signals 6 to 8. The base station 1 communicates with the base station controller 5 via a digital transmission link 9. Usually the subscriber terminal 2 to 4 is a mobile telephone. The signals 6 to 8 between the base station 1 and the subscriber terminals 2 to 4 comprise digitized information: speech or data generated by subscribers, or control information generated by the radio system.

Let us now have a closer look at the method of the invention, the solution of which is based on the CDMA/OFDMA method. The CDMA/OFDMA method is preferably used in communication between a base station and subscriber terminals in a digital radio system. In the method the spread coding of a transmission signal according to the CDMA method and the signal modulation by subcarriers according to the OFDMA method are preferably combined, and the signals are then demodulated and multiuser-detected in a receiver. It is preferable to combine multiuser detection with the CDMA/OFDMA method since this enables separation of the signal components generated in multipath propagation and, consequently, restriction of the number of detectable signals, which in turn enables reduction of crosstalk caused by multipath propagation.

In the method of the invention, the signals are spread according to CDMA by e.g. multiplying each symbol pertaining to the data to be transmitted and comprising a bit or a bit combination with a spreading code V having a higher frequency than the data. The spreading codes V are preferably e.g. Walsh/Hadamard codes, substantially orthogonal with respect to one another, i.e. having minimal mutual correlation. The spread-coded symbols are preferably combined by summing into a continuous spread-coded symbol string. This can be expressed mathematically as follows:

$$U = \sum_{i=1}^{K} b_i V_i = [u_0, u_1, \ldots, u_{N_s-1}], \quad (1)$$

where $N_s$ is the length of the spreading code $V_i$, and $b_i$ represents transmission bits by a mapping $b_i \in [-1, 1]$.

A received OFDMA signal can be expressed as:

$$y(nt_s) = (-1)^n \sum_{l=0}^{L-1} \sum_{i=0}^{N_s-1} H_i^l u_i^l e^{j2\pi f_{lN_s+i} t'} + N(t), \quad (2)$$

where $$f_{lN_s+1} = f_0 + \frac{lN_s + i}{T_s},$$

$T = T_s + \sigma$, $\sigma$ is safety time, N is the total number of subcarriers, $T_s$ is symbol duration time, N(t) is noise summed in a signal, and $f_0$ is the frequency of the lowest subcarrier. We can see that the set $[H_i^l U_i^l]$ is a discrete Fourier transformation (DFT) of the signal set $$\left[ y(nt_s) \frac{(-1)^n}{N} \right].$$

According to prior art, the CDMA/OFDMA radio system subcarriers are generated from a signal to be transmitted by e.g. discrete inverse Fourier transformation. DFT consequently generates a filter bank, each filter being adapted to a multiplexed subcarrier. DFT transformation is preferably implemented in accordance with prior art as fast Fourier transformation, i.e. as FFT transformation. Thus, an OFDMA signal can be generated by inverse FFT transformation. When a safety time a, which is longer than the channel impulse response, is preferably reserved between each symbol, the symbols are not mixed in reception since the channel properties change slowly compared with the symbol duration time. The CDMA/OFDMA method has been described in more detail e.g. in the publication: Performance of CDMA/OFDMA for Mobile Communication System, Khaled Fazel, IEEE ICUP'93, pp. 975 to 979, 1993, which is incorporated herein by reference.

Upon reception, a CDMA/OFDMA signal according to the invention is OFDMA demodulated, preferably as FFT transformation, and multiuser-detected by using the following solution of principle:

$$\hat{x} = \text{sgn} H^{-1} y = R^{-1} \hat{y}, \quad (3)$$

where $\hat{x}$ denotes the symbols/bits of the transmitted signal, $H^{-1}$ is the inverse matrix of the cross-correlation matrix of the spreading codes V, y is a received signal at e.g. the output of an adapted filter, $R^{-1}$ is a normalized cross-correlation matrix, and $\hat{y}$ is a normalized output of an adapted filter, commonly used in receivers to correct the signal distortions caused by a channel.

An optimal receiver can be approximated by various methods. In CDMA systems, various methods are used for multiuser detection (MUD). The most common methods include linear multiuser detection, a decorrelating detector and a multi-stage detector. These methods have been described in more detail in the following references: Varanasi, Aazhang: Multistage detection for asynchronous code division multiple access communications, IEEE Transactions on Communications, vol. 38, pp. 509 to 519, April 1990; Lupas, Verdu: Linear multiuser detectors for synchronous code-division multiple access channels, IEEE Transactions on Information Theory, vol. 35, No. 1, pp. 123 to 136, January 1989; and Lupas, Verdu: Near-far resistance of multiuser detectors in asynchronous channels, IEEE Transactions on Communications, vol. 38, April 1990. However, many operations requiring computing capacity, such as matrix inversion operations, are associated with these methods, too.

Another way to solve the problems caused by multiuser interference is to use interference cancellation (IC). In IC-type solutions, users are detected one by one, often in the order of magnitude by removing the effect of the signals of detected users from the received transmission before the next user is detected. Patent publication EP 491668, in which a procedure of the above type is applied to a CDMA cellular radio system, is incorporated as a reference by way of example of such a solution. Interference cancellation methods are computationally more efficient than MUD-type algorithms, but their performance is lower particularly under difficult reception conditions, such as in multipath fading where signal levels are often weak. These methods are best suited for lowering interference originating from the user cell, and thus for improving system capacity.

In the method of the invention, multiuser detection is performed so as to reduce multiple access interference and/or correct frequency-selective fading, resulting in improved detection quality.

In the solution of the invention, the received signals are also grouped or separated from one another according to subcarriers. A subcarrier set has been allocated to each signal, or user. This allows a desired signal set to be selected for multiuser detection or only one signal to be separated for detection. This way subcarriers serve to reduce the number of signals in multiuser detection. This also means that signals are not separated according to spreading codes, but all used spreading codes are allocated to all users.

In the solution of the invention, a prior art maximum likelihood (ML) multiuser detection, or a multiuser detection method based on the like, disassembles the spread coding, generates estimates from the received signal by using a channel estimate, and compares these with a real received signal. Bit or symbol decisions are made in accordance with the most compatible estimate. The channel estimate is generated in a known manner from e.g. a pilot or reference signal, reference data comprising predetermined symbols, or from one or more directly detectable signals.

In the solution of the invention, subcarriers are selected from the frequency band non-uniformly. This is advantageous since undesirable fading situations can be avoided particularly in 2-way channels. Furthermore, the solution of the invention is particularly advantageous when used in the downlink direction of a radio system with the base station spread coding and modulating the signal and the subscriber terminal multiuser-detecting the signal transmitted from the base station. An advantage of this solution is, for example, that in reception the signals can be grouped so as to detect only some of them. All received signals are detected at the base station any way, and thus subcarrier grouping would be quite useless. However, such a solution reduces the computing performed at the subscriber terminal and consequently the necessary computing capacity and energy consumption.

In the method of the invention, subcarriers are hopped by changing the frequency of the modulating subcarrier of each spread-coded signal in a predetermined manner. This allows the signals to be separated from one another upon reception preferably according to the way in which subcarrier frequency hopping takes place, i.e. according to the hopping sequence. The primary purpose of such a procedure is to multiplex different base stations to the same band.

In the method of the invention, subcarrier frequency hopping is implemented by evenly utilizing substantially the entire frequency band. This improves evenly the fading tolerance of all signals.

In the method of the invention, subcarrier frequency hopping is implemented orthogonally by one carrier at a time being available to only one transmitted signal. This can be easily implemented within the range of one cell. This allows signal collisions to be minimized in reception.

Figure 2:
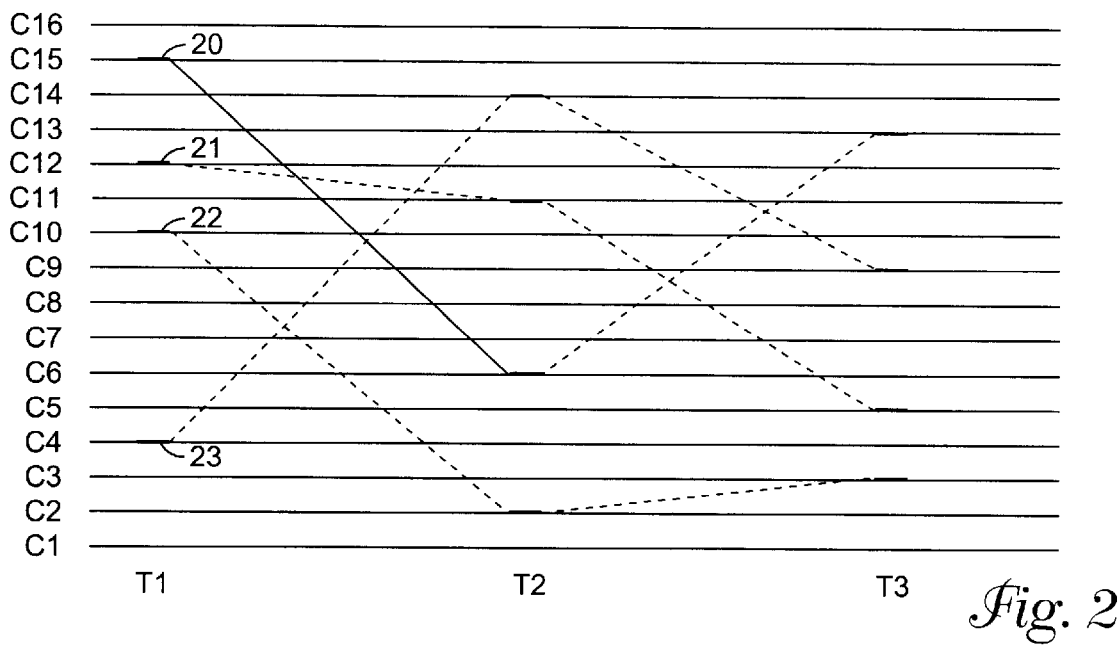
FIG. 2 shows subcarrier frequency hopping.

Referring now to FIG. 2, which shows subcarrier frequency hopping at the output of an OFDMA modulator. The y-axis represents frequency and the x-axis time. In FIG. 2, possible subcarrier frequencies $c1$ to $c16$ are uniform, while subcarriers 20 to 23 are per se preferably non-uniform. As a result of hopping, the frequencies of the subcarriers 20 to 23 change for all signals when moving from one instant $t1$ to $t3$ to another. Additionally, the subcarriers 20 to 23 are evenly distributed to the frequency band at the interval $c1$ to $c16$.

Figure 3:
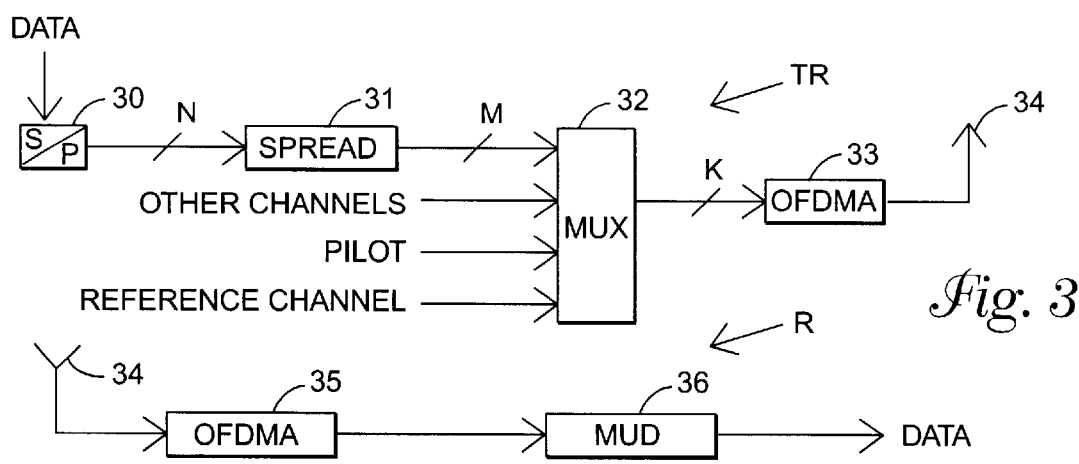
FIG. 3 shows the structure of a transmitter and a receiver.

Reference is now made to the block diagram of a transmitter and receiver in FIG. 3. The transmitter TR comprises a series-parallel converter 30, spread coding means 31, a multiplexer 32, modulation means 33, and an antenna 34. The receiver R comprises an antenna 34, demodulation means 35, and multiuser detection means 36. The transmitter TR and the receiver R implement the inventive method. On the transmitter the data is conveyed as e.g. a bit string to the series-parallel converter 30, which converts series-mode data into parallel-mode. Let us assume that the series-parallel converter 30 has generated a parallel-mode N-bit block of data. These data are spread coded by a spreading sequence of length M in the means 31 whose outputs are summed in the multiplexer 32 into a substantially continuous data flow. The summed sequence is modulated with K subcarriers by the means 33, which is preferably an OFDMA modulator. M<K is true for K subcarriers. The sum signal modulated by the subcarriers is transmitted in accordance with prior art via the antenna 34.

As the receiver antenna 34 receives signals, the means 35 disassemble the subcarrier modulation of the desired signal or signals by FFT transformation. The means 36 submit the demodulated signal to multiuser detection in accordance with prior art. The means 35 group or separate the signals based on the modulation and consequently select the desired signal or signals to detection.

Let us study another example of the inventive solution. In this example the invention is applied to the downlink direction of a radio system, i.e. the transmission direction from a base station to a subscriber terminal. The base station modulates a transmission signal by subcarriers and transmits the generated multicarrier signal on a band width providing sufficient diversity against selective fading. Typically there are dozens or hundreds of subcarriers in use. Eight carriers are reserved for each channel/signal, for example. Signal information is also usually error protected and interleaved in some manner, although it is not essential to the invention. The information to be transmitted is divided in e.g. 8-bit groups and spread-coded by e.g. 8 orthogonal spreading codes which are preferably Walsh-Hadamard sequences. The spread-coded signals are summed and these 8 sum signals are coupled to subcarrier modulators in which the signals are modulated to subcarriers. If frequency hopping is used, the subcarrier modulator also hops the frequency of the sub-carrier of each signal in a predetermined manner. One channel preferably only comprises one signal and one subcarrier. In this case each channel uses e.g. each $10^{th}$ OFDMA signal for the transfer of an 8-bit group time divisionally.

In multiuser detection taking place in a multisymbol detector, detection for 8 parallel bits/symbols is provided by the detected signals and the estimated channel response. At this stage known interference cancellation and multi access detection methods can be utilized, since the originally orthogonal spreading codes are no longer orthogonal because of multipath propagation. Crosstalk can be reduced when channel response and spreading codes are known. Crosstalk occurs between channels inside a cell only because of multipath propagation. However, it is negligible because of the relatively long symbol duration.

In the solution of the invention, subcarrier modulation is preferably carried out as linear modulation, such as phase and amplitude modulation.

The solution of the invention can be implemented by ASIC or VLSI circuits, particularly as regards digital signal processing. The functions to be performed are preferably implemented by microprocessor technology-based software.

Although the invention is described in the above with reference to the example in accordance with the accompanying drawings, it will be appreciated that the invention is not to be so limited, but the it may be modified in a variety of ways within the scope of the inventive idea disclosed in the appended claims.

What is claimed is:

1. A transmitting and receiving method used in a digital radio system comprising at least one base station and subscriber terminal communicating with one another by transmitting and receiving signals, wherein upon transmission spread-coding and modulating the signals by predetermined subcarriers in accordance with Orthogonal Frequency Divisional Multiple Access or Code Division Multiple Access (OFDMA/CDMA) methods, and upon reception demodulating and multiuser-detecting the signals by selecting the signals to be detected in the multiuser detection using the predetermined subcarriers and consequently reducing the number of signals in the multiuser detection.

2. The method as claimed in claim 1, wherein upon reception, as multiple access interference and frequency-selective fading cause signal quality to change, multiuser detection is performed on the received detectable signals to reduce multiple access interference and/or correct selective fading.

3. The method as claimed in claim 1, wherein upon reception, a predetermined group of signals is selected to be detected on the basis of the subcarriers.

4. The method as claimed in claim 1, wherein upon reception, only one of said received signals is selected to be detected on the basis of the subcarriers.

5. The method as claimed in claim 1, wherein as the subcarriers reserve a given frequency band, the subcarriers are selected non-uniformly from the frequency band.

6. The method as claimed in claim 1, wherein the method is used particularly in the downlink direction of a radio system with the base station spread coding and modulating a transmitted signals and the subscriber terminal multiuser-detecting a received signal.

7. The method as claimed in claim 1, wherein upon modulation, the subcarriers are hopped by changing the modulating subcarrier of each spread-coded signal in a predetermined manner.

8. The method as claimed in claim 7, wherein the frequency hopping of the subcarriers is implemented by evenly utilizing substantially an entire frequency band.

9. The method as claimed in claim 7, wherein the frequency hopping of the subcarriers is implemented orthogonally by one carrier at a time being available to only one of the transmitted signal.

10. The method as claimed in claim 7, wherein a signal to be detected upon reception are chosen by means of the hop sequence of the subcarriers.

11. A radio system comprising at least one base station and subscriber terminal with a transmitter and receiver arranged to transmit and receive digital signals wherein the transmitter comprises means for spread coding and means for modulating the transmission signals by predetermined subcarriers in accordance with Orthogonal Frequency Divisional Multiple Access or Code Division Multiple Access (OFDMA/CDMA) methods, and the receiver comprises demodulation means arranged to select a detectable signal on the basis of the predetermined subcarriers, and means for multiuser detection of the received signals.

12. The radio system as claimed in claim 11, wherein the receiver is arranged to perform multiuser detection for reducing multiple access interference and/or correcting selective fading as signal quality in a channel changes because of multiple access interference and frequency-selective fading.

13. The radio system as claimed in claim 11, wherein the demodulation means are arranged to select a predetermined group of signals to be detected on the basis of the subcarriers.

14. The radio system as claimed in claim 11, wherein the demodulation means are arranged to select only one of said received signals to be detected on the basis of the subcarriers.

15. The radio system as claimed in claim 11, wherein as the subcarriers reserve a given frequency band, the modulation means are arranged to select the modulating subcarriers non-uniformly from the frequency band.

16. The radio system as claimed in claim 11, wherein the base station is the transmitter and the subscriber terminal is the receiver.

17. The radio system as claimed in claim 11, wherein the modulation means are arranged to hop the subcarriers by changing the subcarrier modulating each spread-coded signal in a predetermined manner.

18. The radio system as claimed in claim 17, wherein as the subcarriers reserve a given frequency band, the modulation means are arranged to hop the subcarriers by evenly utilizing substantially an entire frequency band.

19. A radio system The radio system as claimed in claim 17, wherein the modulation means are arranged to hop the subcarriers orthogonally by one subcarrier at a time being available to only one of the transmitted signal.

20. The radio system as claimed in claim 17, wherein the demodulation means are arranged to select one or more signals for detection by means of the hop sequence of the subcarriers.

* * * * *